July 30, 1963 P. P. LOESBERG 3,099,788
MONO- AND POLYPHASE ALTERNATING CURRENT GENERATORS
Filed Oct. 22, 1959 2 Sheets-Sheet 1

INVENTOR.
PAULUS PIETER LOESBERG
BY
Marshall, Wilson & Yeasting
-attorneys-

July 30, 1963  P. P. LOESBERG  3,099,788
MONO- AND POLYPHASE ALTERNATING CURRENT GENERATORS
Filed Oct. 22, 1959  2 Sheets-Sheet 2

INVENTOR.
PAULUS PIETER LOESBERG
BY
Marshall, Wilson & Yeasting
-attorneys-

United States Patent Office 3,099,788
Patented July 30, 1963

3,099,788
MONO- AND POLYPHASE ALTERNATING
CURRENT GENERATORS
Paulus Pieter Loesberg, Sassenheim, Netherlands, assignor to N.V. Electrotechnische Industrie voorheen Willem Smit & Co., Gemeente Ridderkerk, Netherlands, a Dutch limited company
Filed Oct. 22, 1959, Ser. No. 848,093
Claims priority, application Netherlands July 17, 1959
6 Claims. (Cl. 322—25)

This invention relates to mono- and polyphase alternating current generators in general and in particular to alternating current generators provided with an excitation winding in which first and second sources of direct current are utilized for the mutually parallel exciting thereof.

In generators of the type described above the first source of direct current consists of a rectifier circuit fed from at least one alternating current circuit in which an alternating voltage proportional to the generator current and an alternating voltage proportional to the generator voltage cooperate in such a manner that the current supplied to the excitation winding by said first source of direct current has a component substantially compensating the armature reaction in the generator. The voltage of the second source of direct current is under the control of a control voltage which is a measure of the deviation of the generator output voltage from a predetermined value. Such a generator as described above is described in the British Patent 745,770. In the British patent the second source of direct current consists exclusively of a rectifier circuit which is fed by a transductor, the transductor being controlled by the generator voltage.

In such circuits as shown in the above referenced British patent in an effort to cut the expense of the compensation circuit, it has been necessary to utilize a transductor suitable for rather high power applications, e.g. 30 to 50 percent of the maximum power required for the excitation winding, even though a high accuracy has not been required. The use of such a transductor leads to a number of objections. If a three-phase transductor is utilized the third harmonic is very pronounced and does not cooperate favorably with the compensation circuit unless additional smoothing means are introduced. For smaller power requirements it is possible to use a mono- or single-phase transductor in which the third harmonic is less troublesome. Then, however, three other objections become apparent which also exist when utilizing the three-phase transductor. First, a large transductor circuit in the circuit in question implies a larger control power. Secondly, the control winding of such transductor has a large time constant which, in turn, makes the control of the generator slow so that under certain circumstances special measures are required to stabilize the control. Thirdly, the transductor in the circuit in question may easily be overloaded thus requiring a special protective circuit.

It is an object of this invention to provide an improved compensation circuit for use with alternating current generators.

It is a further object of this invention to provide an improved compensation circuit and correction device to be utilized with alternating current generators which overcomes the objections stated hereinbefore.

It is a still further object of this invention to provide a novel correction circuit or device for use in compensation circuits.

A still further object of this invention is to provide an improved supply device or circuit for the excitation winding of mono-phase or polyphase alternating current generators.

In accordance with the above objects a feature of the present invention resides in the second source of direct current for an excitation winding of a generator of the kind described above comprising a second rectifier circuit fed from at least one alternating current circuit in which an alternating voltage proportional to the generator current and an alternating voltage proportional to the generator voltage cooperate to provide the direct current output of the second rectifier circuit. In series with the direct current output of this second rectifier circuit is provided an electrical correction circuit or device which is under control of a control voltage to be described hereinafter. In the embodiment of the generator shown herein the effective electromotive force of the second rectifier circuit substantially equals the voltage of the first rectifier circuit at least when the second rectifier circuit does not supply a great portion of the excitation current to the excitation winding.

It will be noted that the effective load resistance of the correction device is substantially independent of the load position of the generator and of the current supplied by the correction device so that for this device only a small amount of control power is required. The terminal voltage of a rectifier circuit during its working interval may be expressed by the term $$\sqrt{(aE^2 - bI^2)}$$

in which "$a$" is a constant differing little from the value of one, E is the electromotive force, I is the direct current and "$b$" is an effective resistance. As a consequence the effective load resistance of the correction device may be kept particularly constant in a wide interval or range by choosing a suitable ratio of the effective internal resistance as herein defined.

Favorable dimensions of the supply circuits for the rectifiers and thus for the excitation winding are obtained by making the correction device or circuit suitable for the continuous supply of voltages less than one third of the excitation required at full load under normal circumstances and for the continuous supply of the current less than one half of the excitation current required at full load under normal circumstances. In one of the preferred embodiments shown herein of the generator circuit the correction device comprises a third rectifier bridge circuit fed by the output of the transducer circuit. The first and second rectifier circuits advantageously each have more than one alternating current supply circuit, whereby the circuits which together supply any of said two rectifier circuits have mutually different phases, whereas the correction device is provided with a mono- or single-phase feeding from the generator output. In accordance with another embodiment of the generator circuit according to this invention the correction device may be provided with a transistor circuit controlled by the control voltage. A theoretically correct control is obtained when the correction device further comprises a third source of direct current in addition to the transistor circuit, the third source being controlled by the transistor circuit. A more simple, and satisfactory for most applications, arrangement is obtained by utilizing the correction device in a purely dissipative manner. In such case the ratio between the voltage being operative therein and proportional to generator voltage and the voltage being operative therein and proportional to the generator current in the second rectifier circuit is advantageously larger than the ratio between the corresponding voltages in the first rectifier circuit.

Further objects, advantages and features of this invention will become apparent when the following description is taken in conjunction with the accompanying drawings, in which.

Figure 1:
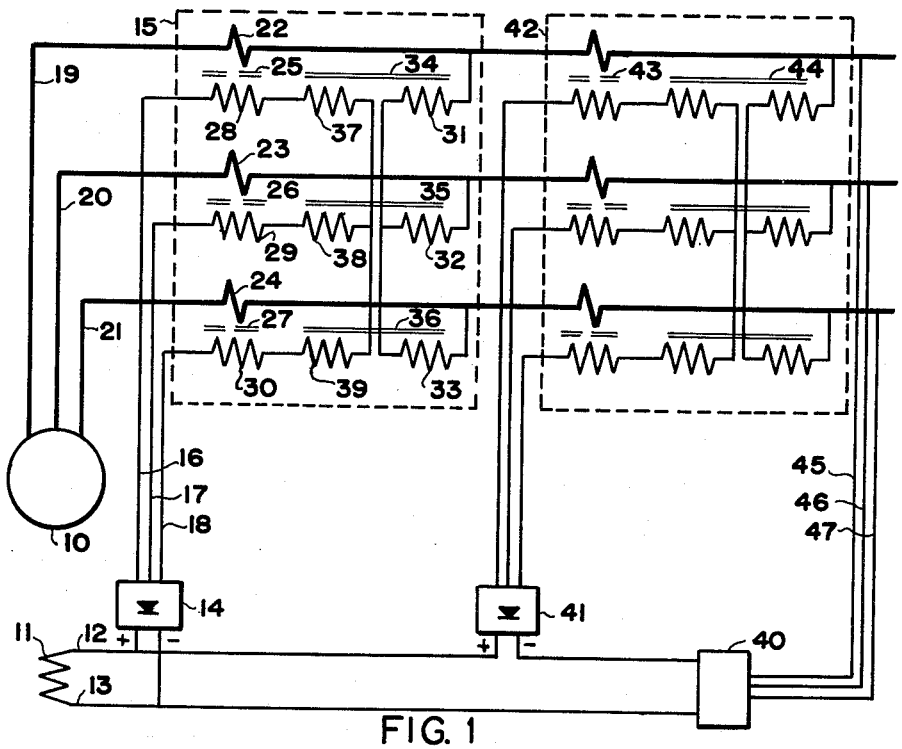
FIG. 1 is a schematic diagram, partially in block diagram form, illustrating an embodiment of the teachings of this invention.

Referring to FIG. 1, an alternating current generator 10 is provided with an excitation winding 11. The excitation winding 11 is fed on conductors 12 and 13 by a rectifier device 14, which is shown symbolically as a three-phase bridge circuit, and from a supply device 15 which supplies the three-phase bridge rectifier 14. Three feeding conductors 16, 17 and 18 connect the supply device 15 with the three-phase bridge 14.

Three main current conductors 19, 20 and 21 through which the generator 10 delivers its output energy are led through the supply device 15, each of the conductors having connected in series therewith the primary windings 22, 23 and 24 of current transformers 25, 26 and 27, respectively. The secondary windings 28, 29 and 30 of the transformers 25, 26 and 27, respectively are connected serially with the conductors 16, 17 and 18. The transformers 25, 26 and 27 are of a type taking a high magnetizing current. Further, there are connected between the conductors 19, 20 and 21 in a star connection the primary windings 31, 32 and 33 of transformers 34, 35 and 36, respectively. The latter transformers are of the type taking a low magnetizing current and have secondary windings 37, 38 and 39 in a star connection to which are connected serially the windings 28, 29 and 30, respectively.

Thus, it can be seen that there is induced in the conductors 16, 17 and 18 voltages proportional to the current in the conductors 19, 20 and 21. There is also induced in the conductors 16, 17 and 18 by the transformers 34, 35 and 36, respectively, voltages which are proportional to the generator output voltage. The phase relation between these induced voltages is such that the current supplied to the excitation winding 11 by the rectifier circuit 14 substantially compensates for the armature reaction in the generator.

A second three-phase rectifier bridge 41 and a correction device 40 are connected in series to supply the excitation winding 11 in parallel with the first source of direct current 14. The three-phase rectifier 41 is fed by a supply device 42 which is shown in FIG. 1 as schematically identical in construction to the supply device 15, but may have dimensions generally differing from the supply device 15 as described hereinbefore. The supply device 42 shows transformers, for example 43 and 44, which can be compared in position and function with the transformers 25, 26, 27 and the tranformers 34, 35, 36, respectively, of the supply device 15. If desired, the transformers 34 and 44 could be combined so as to form one single transformer with only one star connected primary winding but having dual star connected secondary windings for supplying the rectifier circuits 14 and 41. Although shown as mono- or single-phase transformers in FIG. 1, obviously three mono- or single-phase transformers can be combined so as to form a three-phase transformer.

Figure 2:
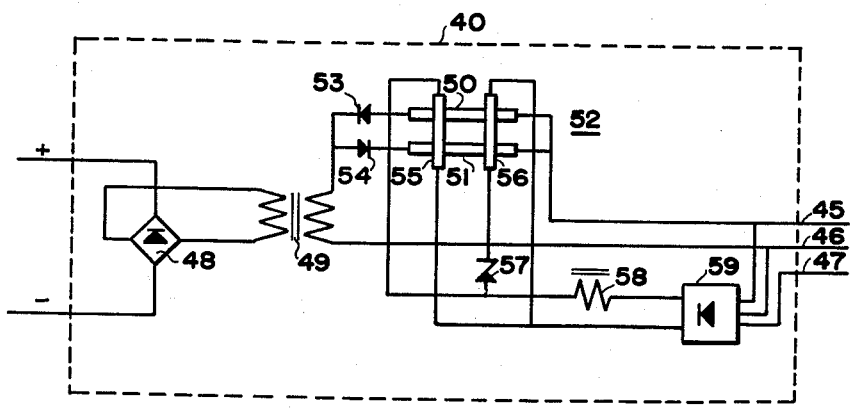
FIG. 2 is a schematic diagram, partially in block diagram form, of the correction device shown in block diagram form in FIG. 1.

The correction device 40 is connected to the main current conductors 19, 20 and 21 by the conductors 45, 46 and 47. Referring to FIG. 2, there is shown in more detail the schematics of the correction device or circuit 40 which is represented by a block diagram in FIG. 1. The correction device comprises a bridge type rectifier 48 fed from the conductors 45 and 46 by means of a transformer 49. A transductor designated generally at 52 is connected in series with the conductor 45. That is, main current or output windings 50 and 51 having connected serially therewith oppositely poled rectifiers 53 and 54, respectively, the two series circuits in turn connected in parallel and the parallel circuits connected in series with the conductor 45. The transductor 52 has two control windings 55 and 56, the winding 55 being connected directly to, and the winding 56 being connected in series with a breakdown diode of the Zener type, to a direct current voltage which is supplied by a three-phase bridge rectifier circuit 59 and smoothed by a choke 58. The bridge rectifier 59 is fed from the conductors 45, 46 and 47.

If the generator 10 is driven at the correct speed, the supply device 15 through the three-phase rectifier bridge 14 will be able to excite the generator in such a manner that in a wide range of loads the voltage will not deviate more than a few percentage points of the required value. When the correction device 40, as shown in FIG. 2, is utilized, the supply device 42 has components chosen in such a manner that in a particular range of loads (e.g. from no load to one half load with cos phi between 0.7 and 1) the open voltage of the device 41 substantially equals the voltage generated over the excitation winding 11 by the device 14 if the three-phase rectifier 14 is the only device feeding the excitation winding.

If the correction device 40 does not deliver any voltage the three-phase bridge 41 will have little tendency to deliver energy to the winding 11. When the output of the correction device 40 reaches a predetermined low voltage (e.g. one tenth of the voltage over the winding 11) the three-phase bridge rectifier 41 in cooperation with the device 40 supplies current to the excitation winding 11. The correction device 40 will deliver only a small part of the energy supplied to the winding 11 in this way.

Assume that, at a certain load, there are induced in the supply circuits 15 and 42 of the three-phase rectifier bridges 14 and 41, respectively, total voltages $e_1$ and $e_2$ respectively. The terminal voltages delivered by the devices 14 and 41 delivering respectively currents $i_1$ and $i_2$ approximately may be expressed by $$\sqrt{(a_1 e_1^2 - b_1 i_1^2)} \qquad (1)$$

$$\sqrt{(a_2 e_2^2 - b_2 i_2^2)} \qquad (2)$$

respectively. For more details see AIEE Transactions, May 1953, pages 192 to 202, and July 1953, pages 244 to 253. If the resistance of the winding 11 is denoted by $r$ and the terminal voltage of the device 40 by $e$ it may be deduced that:

$$e = (1-q)\, r i_2 + \sqrt{(q a_1 e_1^2 - q^2 b_1 i_2^2)} - \sqrt{(a_2 e_2^2 - b_2 i_2^2)} \qquad (3)$$

in which $$q = r^2/(r^2 + b_1) \qquad (4)$$

When $$a_2 = q a_1 \qquad (5)$$

and $$b_2 = q^2 b_1 \qquad (6)$$

then it is deduced that:

$$\frac{e}{i_2} = (1-q) r \qquad (7)$$

It now appears from Equation 7 that the load resistance of the correction device 40 is highly constant. The magnitudes $b_1$ and $b_2$ can be considered as effective internal resistance.

When a value of $b_1$ is chosen such that $q$ is smaller than one half, a constant load of the correction device will be obtained provided that $i_2$ is very small if $e$ is zero. The value of $b_2$ then is of small importance. Since the load of the correction device is nearly constant the transductor 52 may be controlled by a normal control power. Since the voltage $e$ and the current $i_2$ may be much lower than the highest voltage over and the highest current in the winding 11, normal operation being assumed, the power of the transductor may be approximately one sixth or fifteen percent of the maximum excitation power of the generator or even less thus requiring a low control power and allowing a very fast speed of response of the control of the transductor 52.

The low control power permits a high accuracy to be obtained with the device shown in FIG. 2. For the operation of the control device it is important that the voltage of the rectifier bridge 59 as smoothed by the choke 58 is a measure of the output voltage of the generator. If the voltage from the rectifier device 59 exceeds the breakdown voltage in the reverse direction of the Zener type breakdown diode 57 a current will flow through the control winding 56 thus reducing the effect of the current flowing through the control winding 55 thereby decreasing the tendency of the transductor to have an increased output due to the current flowing through the control winding 55. A small alteration in the control current is thus sufficient for decreasing the excitation of the generator and thus an accuracy of 0.5 percent is easily obtained. By amplifying the control current a higher accuracy of 0.1 percent or still better can be obtained. The transductor 52 shown in FIG. 2 is of the self-exciting type and co-operates with the transformer 49 and the rectifier bridge 48 to provide an improved control or correction device to control the generator 10.

Figure 3:
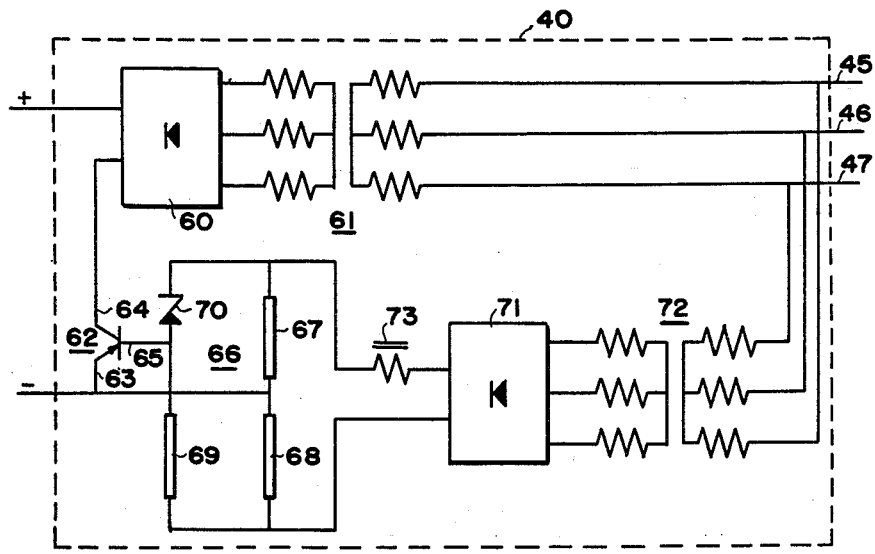
FIG. 3 illustrates a second embodiment of the correction device utilized in this invention.

Referring to FIG. 3 there is shown a second embodiment of the correction device 40 which comprises a three-phase bridge rectifier 60 fed from the conductors 45, 46 and 47 by a transformer 61. The direct current voltage thus generated from the rectifier bridge 60 is partially destroyed or attenuated by the transistor 62. The emitter electrode 63 and the collector electrode 64 of the transistor 62 are connected in series with the direct current voltage supplied by the rectifier bridge 60. A control current for the transistor 62 is derived from a bridge, three branches of which are constituted by the resistors 67, 68 and 69, the fourth branch of which comprises a Zener type breakdown diode 70.

The control bridge for the transistor 62 is supplied by a direct current derived from a three-phase rectifier 71 fed from the conductors 45, 46 and 47 through a transformer 72. The output of the rectifier bridge 71 is smoothed by a choke 73.

The correction device illustrated in FIG. 3 operates as follows. When the generator 10 voltage is below such a value that the direction current output from the rectifier 71 generates a voltage lower than the breakdown voltage of the Zener type breakdown diode 70, a current will flow through the emitter electrode 63 and base electrode 65 circuit of the transistor 62 causing the transistor 62 to have a low resistance in its emitter 63, collector 64 circuit. Thus, more current supplied by the bridge circuit 60 will be allowed to flow to the excitation winding 11.

When, however, the generator voltage increases, such that the output from the rectifier device 71 exceeds the breakdown voltage of the Zener type diode 70 the current will flow through the diode 70 in the reverse direction. As soon as the current flowing through the diode in the reverse direction equals the current in the resistor 69, the transistor 62 will be biased toward cutoff because of the lowering of the current flow through the emitter-base circuit thus causing the resistance emitter-collector circuit of the transistor 62 to rise toward cutoff. The generator voltage will therefore decrease because of the decrease in excitation and the system will regulate the equilibrium. This embodiment is particularly useful for small generators and in cases where the speed of response of the control regulation is a factor.

Figure 4:
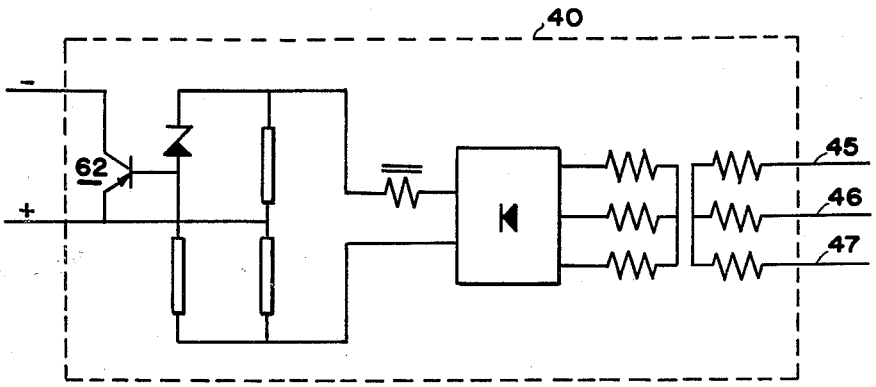
FIG. 4 illustrates a third embodiment of the correction device utilized in this invention.

Referring to FIG. 4 there is shown another embodiment of the correction device 40 which is substantially identical to that shown in FIG. 3 with the exception that the rectifier bridge 60 and the transformer 61 have been deleted. With this embodiment the secondary windings of the transformer 44 of the supply device 42 are advantageously wound such that an additional voltage is supplied to the rectifier bridge 41 which is then available for being destroyed or regulated in the emitter-collector circuit of the transistor 62. In such case the ratios between the voltages induced in the supply devices 15 and 42 which are proportional respectively to the generator voltage and the generator current will no longer be substantially identical. Moreover, the sign of the voltage of the correction device 40 with the embodiment illustrated in FIG. 4 as utilized will be opposite to the sign of the voltage in the cases illustrated in FIGS. 2 and 3. Since operation of the device in FIG. 4 has been detailed hereinbefore it is deemed that further description of such operation is unnecessary.

In conclusion it is pointed out that while the illustrated example constitutes a practical embodiment of my invention, I do not limit myself to the exact details shown, since modification of the same may be varied without departing from the spirit of this invention.

I claim as my invention:

1. Electrical control apparatus for alternating current generators having an excitation winding, comprising; a first source of direct current including a first rectifier circuit and means for applying to said rectifier circuit an alternating voltage proportional to an output current of said generator and an alternating voltage proportional to an output voltage of said generator; a second source of direct current including a second rectifier circuit and means for applying to said second rectifier circuit an alternating voltage proportional to said output current and an alternating voltage proportional to said output voltage of said generator; said first and second sources of direct current being connected in parallel to said excitation winding; a correction circuit connected in series with said second source of direct current; means for deriving a control voltage which is a measure of the deviation of said generator output voltage and applying same to said correction circuit; said correction circuit controlling the application of said second source of direct current to said excitation winding in response to the magnitude of said control voltage; said correction circuit being adapted to supply continuously a voltage of less than one third of the required voltage and a current less than one half of the required current to said excitation winding at full load under normal circumstances, so that the nominal power of said correction circuit is less than one sixth of the power corresponding to the largest admissible continuous heat generation in the excitation winding.

2. Electrical control apparatus for alternating current generators having an excitation winding, comprising; a first source of direct current including a first rectifier circuit and means for applying to said rectifier circuit an alternating voltage proportional to an output current of said generator and an alternating voltage proportional to an output voltage of said generator; a second source of direct current including a second rectifier circuit and means for applying to said second rectifier circuit an alternating voltage proportional to said output current and an alternating voltage proportional to said output voltage of said generator; said first and second sources of direct current being connected in parallel to said excitation winding; a correction circuit connected in series with said second source of direct current; means for deriving a control voltage which is a measure of the deviation of said generator output voltage and applying same to said correction circuit; said correction circuit controlling the application of said second source of direct current to said excitation winding in response to the magnitude of said control voltage; the proportion between the alternating voltage proportional to said output voltage and an alternating voltage proportional to said output current at said second rectifier of said second source of direct current is larger than the corresponding voltages at said first rectifier of said first source of direct current.

3. Electrical control apparatus for alternating current generators having an excitation winding, comprising; a first source of direct current including a rectifier circuit and means for applying to said rectifier circuit an alternating voltage proportional to an output current of said generator and an alternating voltage proportional to an output voltage of said generator; a second source of direct current including a rectifier circuit and means for applying to said rectifier circuit an alternating voltage proportional to an output current of said generator and an alternating voltage proportional to an output voltage of said generator; a correction circuit connected in series with said second source of direct current; means for deriving a control voltage which is a measure of the deviation of said generator output voltage and applying same to said correction circuit; said correction circuit controlling the application of said second source of direct current to said excitation winding in response to the magnitude of said control voltage; said first source and the series connection of said correction circuit with said second source being connected in parallel to said excitation winding.

4. Electrical control apparatus as defined in claim 3 in which the correction circuit comprises a rectifier bridge connected in series with said second source of direct current and a transducer having an output connected to said bridge.

5. Electrical control apparatus as defined in claim 3 in which the effective electromotive force of the second rectifier circuit substantially equals the terminal voltage of the first rectifier circuit.

6. Electrical control apparatus as defined in claim 3 in which the proportion of the effective internal resistances of said first and second sources of direct current is such that the effective resistance of said correction circuit is substantially independent of the current flowing therethrough.

References Cited in the file of this patent

UNITED STATES PATENTS

| | | |
|---|---|---|
| 2,672,585 | Hotson | Mar. 16, 1954 |
| 2,841,755 | Kramer | July 1, 1958 |